US011323661B2

(12) United States Patent
He et al.

(10) Patent No.: US 11,323,661 B2
(45) Date of Patent: May 3, 2022

(54) MULTI-DEVICE RECORDING SYNCHRONIZATION METHOD AND SYSTEM, AND CONFERENCE SYSTEM

(71) Applicant: YEALINK (XIAMEN) NETWORK TECHNOLOGY CO., LTD., Xiamen (CN)

(72) Inventors: Weiwei He, Xiamen (CN); Lianchang Zhang, Xiamen (CN); Wanjian Feng, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/992,914

(22) Filed: Aug. 13, 2020

(65) Prior Publication Data

US 2021/0051301 A1 Feb. 18, 2021

(30) Foreign Application Priority Data

Aug. 16, 2019 (CN) .......................... 201910756119.4

(51) Int. Cl.
| | |
|---|---|
| *H04N 7/15* | (2006.01) |
| *H04L 65/1069* | (2022.01) |
| *H04L 65/1083* | (2022.01) |
| *H04N 5/77* | (2006.01) |
| *H04N 7/14* | (2006.01) |
| *H04L 65/401* | (2022.01) |
| *H04L 65/403* | (2022.01) |

(Continued)

(52) U.S. Cl.
CPC ......... *H04N 7/155* (2013.01); *H04L 65/1069* (2013.01); *H04L 65/1083* (2013.01); *H04L 65/403* (2013.01); *H04L 65/4015* (2013.01); *H04L 67/40* (2013.01); *H04N 5/77* (2013.01); *H04N 7/147* (2013.01); *H04N 7/152* (2013.01); *H04L 12/1831* (2013.01)

(58) Field of Classification Search
USPC ...................................................... 348/14.02
See application file for complete search history.

(56) References Cited

U.S. PATENT DOCUMENTS

2016/0099984 A1* 4/2016 Karagiannis ........ H04L 65/1083
709/206
2016/0150190 A1* 5/2016 Hatae ..................... H04N 7/181
348/159

(Continued)

*Primary Examiner* — Maria El-Zoobi

(57) ABSTRACT

The present disclosure discloses a multi-device recording synchronization method and system, and a conference system, and belongs to the field of recording marking. For the problem in the prior art that a device that supports a recording marking function only supports generation and use on a single device, the present disclosure provides a system, including one master and a plurality of slaves. The master is connected to the plurality of slaves. The master operates according to the instruction sent by the slave and broadcasts state information globally. Through a network connection between the master and the slave, the master stores, on the master, recording and marking data sent by the slave, and synchronizes the data between devices, and a multi-device recording marking and synchronization system is applied to a conference system. The present disclosure is very convenient for use and has simple operation logic and low system costs.

16 Claims, 3 Drawing Sheets

(51) Int. Cl.
*H04L 67/133* (2022.01)
*H04L 12/18* (2006.01)

(56) References Cited

U.S. PATENT DOCUMENTS

| | | | | |
|---|---|---|---|---|
| 2017/0271917 A1* | 9/2017 | Dhanjal | .................. | H02J 3/005 |
| 2018/0295011 A1* | 10/2018 | Wang | .................. | H04L 41/0833 |
| 2019/0075171 A1* | 3/2019 | Childress | ............ | H04L 65/1066 |

* cited by examiner

MULTI-DEVICE RECORDING SYNCHRONIZATION METHOD AND SYSTEM, AND CONFERENCE SYSTEM

CROSS-REFERENCE TO RELATED APPLICATIONS

The present application claims the benefit of Chinese Patent Application No. 201910756119.4 filed on Aug. 16, 2019, the contents of which are hereby incorporated by reference.

BACKGROUND

Technical Field

The present disclosure relates to the field of recording marking, and more specifically, to a multi-device recording synchronization method and system, and a conference system.

Related Art

Recording is a process of recording sound signals on the media. With the continuous development of digital technologies, a recording function evolves from analog recording such as original mechanical recording, optical recording, or magnetic recording to current digital recording, which is widely applied to various scenarios. Recording marking is to perform marking when important information is recorded during recording, so that users can quickly find a location of the important information in the recording according to the recording marking and play the important information back in time, especially when there is much recording content.

In a video conferencing system, people at a plurality of locations are connected through a network for a face-to-face conversation. Through the video conferencing system, participants can see movements and expressions of other participants and have a sense of immersion. However, for most conferences, image data is mostly invalid information, and audio information is the most important. For video conferences such as training and learning, recording a conference is one of main means of storing the conference. During recording, users mark key parts in the conference accordingly, so that the key parts can be quickly found later. Currently, a device that supports a recording marking function on the market only supports generation and use on a single device, and a plurality of device terminals cannot perform recording marking in a same conference.

Chinese Patent Application No. 201310617076.4 filed on Mar. 19, 2014 and entitled "RECORDING MARKING METHOD AND APPARATUS, TERMINAL, SERVER, AND SYSTEM" discloses a recording marking method and apparatus, a terminal, a server, and a system, and belongs to the field of computer technologies. The method includes: detecting whether a mark data structure in a terminal is different from a mark data structure in a server, the mark data structure being used to record a marking event of audio data in an audio file during recording; and if a detection result is that the mark data structure in the terminal is different from the mark data structure in the server, triggering synchronization of the mark data structure in the terminal and the mark data structure in the server. This resolves the problem that information acquisition efficiency is reduced because a plurality of terminals may miss marking some key content during recording and the terminals need to repeatedly listen to find the missed key content in audio data when playing the recorded audio data, so that the information acquisition efficiency is improved. In this method, the data structures need to be compared during the synchronization. When the mark data structure is different from the data structure in the server, the synchronization is triggered, and this operation is more complicated. Although the information acquisition efficiency is improved, a large amount of data is redundant on a master, and the comparison process causes a time loss, resulting in a specified time delay.

SUMMARY

1. Technical Problems to be Resolved

For the problem that a device that supports a recording marking function on the market only supports generation and use on a single device, the present disclosure provides a multi-device recording synchronization method and system, and a conference system, so that recording marking and recording control can be synchronized between a plurality of devices, network bandwidth is used less, precision is high, and a master and a slave are allowed to run in different systems and use different development languages. In addition, multi-device recording, marking, and synchronization functions are implemented in the conference system. Therefore, the present disclosure is very convenient for use and has simple operation logic and low system costs.

2. Technical Solutions

The objective of the present disclosure is achieved by the following technical solutions.

A multi-device recording synchronization method is provided, including the following steps.

Step 1: A master respectively establishes connections with an external network and a slave through network ports, at least one slave being connected. The master respectively establishes the connections with the external network and the slave through the network ports, an IP of the master being a fixed IP, and the master includes two network ports: a Wan port and a Phone port. Wan is used for the external network connection, and the network connected to the Phone port is used to access the slave. The slave periodically sends requests to the master, and if a reply is received, it is considered that the slave is connected to the master.

Step 2: The master establishes a file sharing service with the slave, and allows the slave to read a recording data file and a marking data file of the master. The master uses a samba service to allow the slave to read the files on the master, and the slave starts to request related data after being connected to the master. After receiving the request from the slave, it is considered that the slave is connected to the master and an IP of the slave is maintained in a slave list. The samba service is software based on the SMB protocol, and can share a file in a local area network and allow running in different systems.

Step 3: The master communicates with the slave, performs a recording-related operation according to an instruction received by the slave, and broadcasts a state between slaves. The master are connected to a plurality of slaves in the disclosure, and the master performs the operation after receiving the instruction sent by the slave, and broadcasts a record state to all slaves, and all the slaves enter a corresponding state synchronously. When the plurality of slaves send instructions to the master, the instructions received first are executed in an order of receiving the instructions by the master, and the operation is performed through the master's timestamps, thereby resolving the problem that local time inconsistency of a plurality of devices leads to a deviation in precision of generating marks. In addition, network bandwidth is used less, and the present disclosure is very convenient for use and has simple operation logic and low costs.

Still further, a remote procedure call manner is used for communication between the master and slave. RPC or remote procedure call is a protocol in which a service is requested from a remote computer program through a network without to understand an underlying network technology, and is an open source RPC framework based on the socket protocol to allow applications deployed on different servers to call programs. In the present disclosure, the RPC framework allows the master and the slave to send instructions to each other to complete data interaction. The RPC framework is used to improve development efficiency and system scalability, allowing the master and the slave to use different systems and different development languages. The solution of generating and storing mark data by the master can effectively reduce a case in which data is not synchronized between different devices and resolve a problem of inconsistent timestamps when the slave individually performs marking, and can also reduce use of network bandwidth.

Still further, after the master is started and is connected to the slave in step 1, the slave sends a heartbeat packet to the master at a specified time interval to confirm that the slave is alive. The heartbeat packet is a self-defined command word that periodically informs respective states between the master and slave, and is sent at the specified time interval, which is similar to a heartbeat and is referred to as a heartbeat packet. After the master is connected to the slave, the slave sends a heartbeat packet to the master at the specified time interval to confirm that the slave is alive. If the slave is disconnected from the master, the slave re-sends a connection request to the master.

Still further, sending a request by the slave to the master in step 3 includes starting recording, stopping recording, performing marking, and obtaining a mark. The master receives a request instruction sent by the slave and performs a corresponding operation. An instruction sending procedure is defined as follows: If a device B needs to send an instruction X and an instruction with a parameter Y to a device A, the device A defines a method X(a) with a method name X and a parameter a, and the device B calls the method X(a) of device A through the RPC framework to input the parameter Y, that is, the device B sends the instruction X=Y to the device A.

Relevant instructions during recording are defined as follows: Start Record is used to request to start recording, Stop Record is used to request to stop recording, Mark is used to request to mark recording, Get Mark is used to request to obtain mark data of a file, and Record State is used to send a record state of a current conference system.

Still further, in step 3, the master broadcasts a recording state or an idle state to the slave after receiving the instruction, and all slaves enter a corresponding recording or idle state synchronously after the master broadcasts the state. The master broadcasts content after receiving the instruction sent by the slave, all slaves synchronize states according to the broadcast content, the master does not perform recording, and the slave transmits data to the master for storage after recording. Due to particularity of the conference system, the plurality of slaves cannot perform simultaneous reception, and timestamps of the master are used to perform a sorting operation uniformly, so that data duplication and confusion are avoided.

Still further, when the master is idle, any slave may send an instruction to the master to request to start recording or to obtain a mark. The slave sends a Start Record instruction to the master, and the master starts recording and broadcasts a record state: Record State=recording to the slave. All slaves in the system enter the record state synchronously. In this case, the master broadcasts the record state to the slave and does not perform recording, and the recording operation is completed by the slave. The slave sends recording data to the master during recording, and when performing the recording operation, the master receives voice data in the process of the conference system, and then stores a data stream with other data to a locally stored recording file after the master performs an integrated operation such as echo cancellation on the voice data.

When the user needs to perform obtain a mark and play recording in the idle state of the master, the slave obtains a file list through the master, the user selects a name of a to-be-played file from the file list obtained by the slave, and the slave queries a database of the master for the mark data with the name of the recorded file through the file name, sends an instruction Get Mark to the master, and queries the database of the master for the mark data with the name of the recorded file through the file name. The slave directly accesses the file of the master through a samba service, obtains the mark data, and displays the mark data in a progress bar according to a time progress and presents the mark data to the user. The user clicks on a time mark, and a player directly jumps to a corresponding time point.

Still further, any slave in the recording state may send an instruction to the master to request to stop recording or to perform recording marking. Any slave may send a Stop Record instruction to the master to request the master to stop recording. After receiving the Stop Record instruction, the master stops recording and broadcasts a record state: Record State=idle. The slave is instructed to update the record state. During recording, any slave may send a Mark instruction to the master, and after receiving the Mark instruction, the master stores a marked recording point, that is, a current recording progress, in the database. When the recording progress is stored, Key is a file name and Value is a recording progress. Recording mark information and recording file information are separately stored, the mark information being stored in the database of the master, and the recording information being stored in a locally stored recording file. When a plurality of slaves simultaneously request marks, an operation is performed based on an instruction first received by the master.

In the present disclosure, the master receives requests from the slaves, and generates and stores recording data and mark information on the master according to recording data and mark data transmitted from the slave, and if each slave needs to obtain data, the slave obtains the data from the master. This manner can ensure data consistency. In addition, all timestamps are generated locally by the master in an order of receiving the requests of the slaves. Since the timestamps are generated at a same local time, mark information is synchronized to the master after the slave generates the mark, so that precision is high, and there is no deviation in precision of generating marks caused by local time inconsistency of the devices. When a new device is connected to the system, data is synchronized with the master once. In comparison with the technical solution in which the slave generates a mark and stores the mark locally, and simultaneously synchronizes data with other devices, a request needs to be sent to the master only once in the present disclosure. Therefore, network bandwidth is used less, and inconsistency between mark data of the slave and data of other devices due to network abnormality and other reasons is not caused. In addition, due to particularity of the conference system, other functions of the slave are also unavailable when the master is abnormal, and there is no data inconsistency caused by continuous recording of the slave when the master is not in the state.

A multi-device recording synchronization system is provided, and the system adopts the above multi-device recording synchronization method. The system includes one master and a plurality of slaves, the master and the slaves are connected through network ports to form an internal network, and a remote procedure call RPC framework is used in the internal network for communication. The master collects requests of the slaves, and generates and stores the mark on the master, and if each slave needs to obtain data, the slave needs to obtain the data from the master to ensure data consistency. The master is further connected to an external network, and the master computer performs information interaction with other devices through the connection with the external network. Therefore, the present disclosure is suitable for more scenarios, such as a conference system.

A conference system is provided, including a multi-device recording synchronization system and further includes a camera, a display, and an audio play device, where the camera, the display, and the audio play device are all connected to a master, the camera being configured to capture video information in a conference and send the video information to the master, the display being configured to play the video information sent by the camera to the master, and the audio play device being configured to play audio information in the conference.

Still further, the camera, the display, and the audio play device are connected to the master through a wireless connection. The wireless connection simplifies conference deployment and facilitates operation. The multi-device recording marking and synchronization system is applied to the conference system, and therefore a plurality of devices can perform recording and marking in a same conference to mark key parts in the conference system, so that the key parts can be quickly found later. In addition, a recording and marking synchronization function can be implemented between the plurality of devices, instead of a radio function of a single device, thereby ensuring consistency of recording and marking data between the plurality of devices. Therefore, the present disclosure is very convenient for use and has simple operation logic and low system costs.

3. Beneficial Effects

Compared with the prior art, advantages of the present disclosure are:

In the present disclosure, the master receives requests from the slaves, and generates and stores recording data and mark data on the master according to recording data and mark data transmitted from the slave, and if each slave needs to obtain data, the slave obtains the data from the master. This manner can ensure data consistency. In addition, all timestamps are generated locally by the master in an order of receiving the requests of the slaves. The present disclosure is particularly suitable for the conference system. When a plurality of devices are connected in the conference system, the user can perform recording control and recording marking on any device, so that consistency of recording data can be ensured. Therefore, the present disclosure has low system costs and simple operation logic and is very convenient for use.

DETAILED DESCRIPTION

The present disclosure will be described in detail below with reference to the accompanying drawings and specific embodiments.

Embodiment 1

Figure 3:
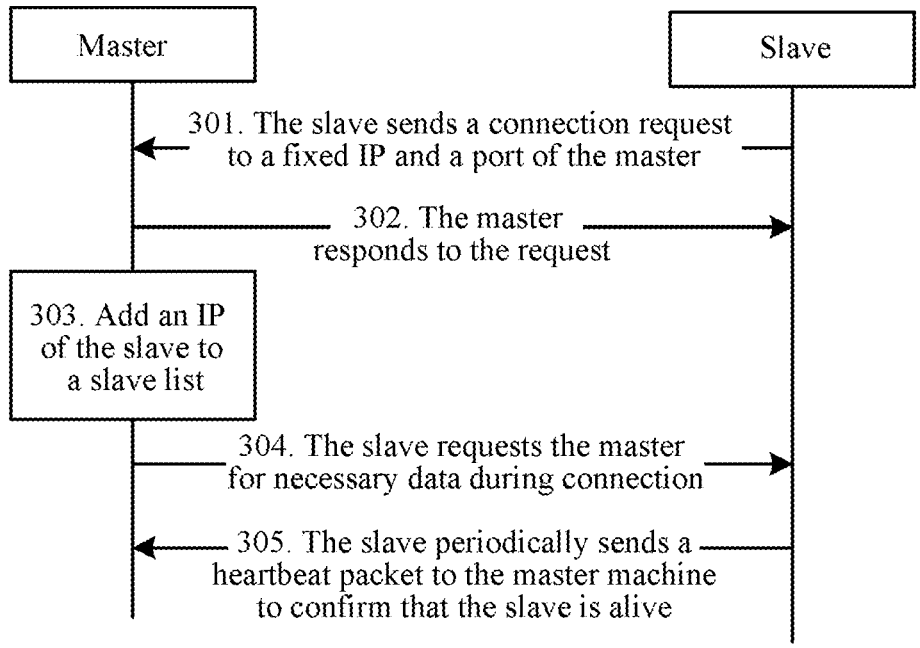
FIG. 3 is a schematic diagram of interaction between a master and a slave according to the present disclosure.
Figure 4:
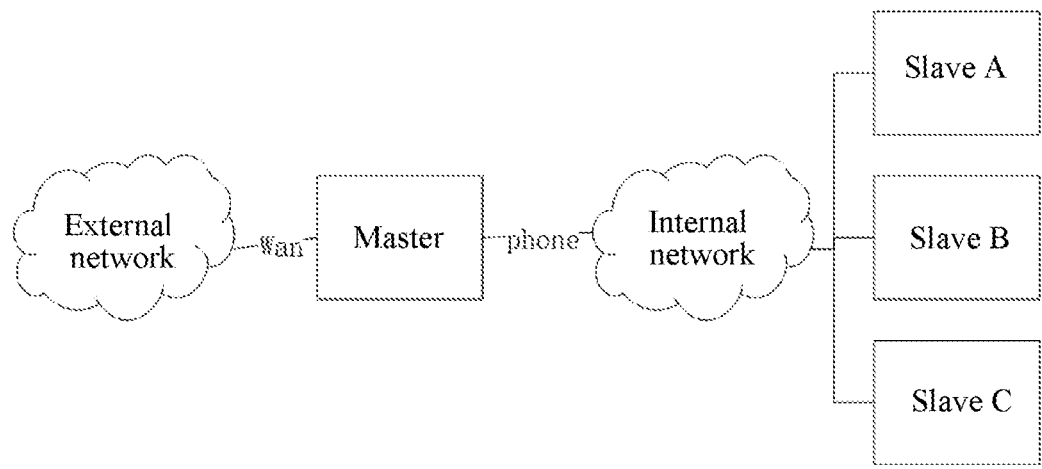
FIG. 4 is a schematic diagram of a network connection between a master and a slave according to the present disclosure.

A multi-device recording synchronization system includes one master and a plurality of slaves. As shown in FIG. 4, the master includes two network ports: a WAN port and a Phone port, the WAN port being used to connect the master to an external network, and the Phone port being used to connect the master to a network connected to the slave. As shown in FIG. 3, an IP address of the Phone port of the master is a fixed address, such as 192.168.0.23. The slave is started to periodically request the fixed IP and the port, such as 192.168.0.23:6565, an initial IP address of the Phone port is fixed to 192.168.0.23, and the WAN port is connected to the external network to obtain an IP address of 10.81.32.10. A slave 1, a slave 2, and a slave 3 are connected to the Phone port of the master through a switch, and are assigned with IPs from the master by DHCP, such as 192.168.0.150, 192.168.0.151, and 192.168.0.152, respectively. The slave sends a registration request to the fixed port 192.168.0.23: 6565 of the Phone port of the master. When the master receives the request and sends a registration success reply, the slave is connected to the master and starts to request related data. After receiving the request, the master considers that the slave is connected to the master and an IP of the slave is maintained in a slave list. The slave periodically sends a heartbeat packet to the master at a specified time interval to ensure that a normal connection of a socket is not broken and to ensure that the slave is alive.

The master starts a samba service to establish a file sharing service, and allows the slave to easily read a file on the master. The master communicates with the slave by using an open source RPC framework based on the socket protocol, that is, a remote procedure call framework, to allow applications deployed on different servers to call the method in programs. The RPC framework allows the master and the slave to send instructions to each other to complete data interaction. The RPC framework is used in this embodiment to improve development efficiency and system scalability, allowing the master and the slave to use different systems and different development languages.

An instruction sending procedure is defined as follows: If a device B needs to send an instruction X and an instruction X=Y with a parameter Y to a device A, the device A defines a method X(a) with a method name X and a parameter a, and the device B calls the method X(a) of device A through the RPC framework to input the parameter Y, that is, the device B sends the instruction X=Y to the device A.

Relevant instructions during recording are defined as follows: Start Record is used to request to start recording, Stop Record is used to request to stop recording, Mark is used to request to mark recording, Get Mark is used to request to mark data of a file, and Record State is used to send a record state of a current conference system.

Figure 1:
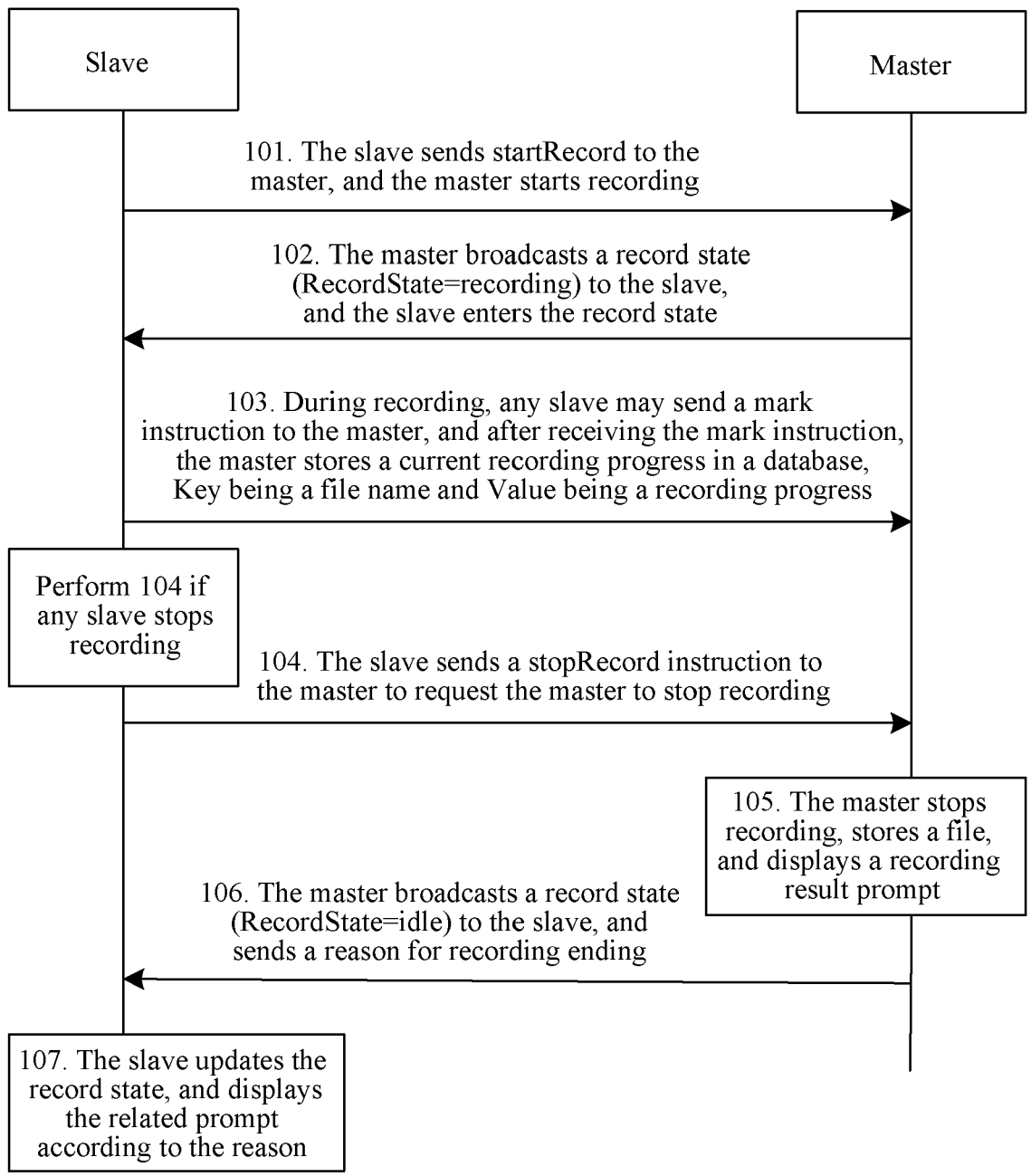
FIG. 1 is a schematic diagram of a recording procedure of a slave according to the present disclosure.

As a recording procedure of a slave shown in FIG. 1, when the slave sends a Start Record instruction to the master, and the master accepts the request to start recording and generates a recording file name such as AudioRecord20190805101902078.amr according to a time stamp of the received instruction. The master broadcast a record state: Record State=recording to the slave, and other slaves in the system enter the record state synchronously after receiving the record state. In this case, the master broadcasts the record state to the slave and does not perform recording, and the recording operation is completed by the slave. The slave sends recording data to the master during recording. Due to particularity of the video conference system, the plurality of slaves cannot perform simultaneous reception. When performing the recording operation, the master receives voice data in the process of the conference system, and then stores a data stream with other data to a locally stored recording file after the master performs an integrated operation such as echo cancellation on the voice data.

During recording, any slave may send a Mark instruction to the master, and after receiving the Mark instruction, the master stores a current recording progress in the database. When the recording progress is stored, Key is a file name and Value is a recording progress. A time unit of the timestamp for receiving the request in the recording progress is milliseconds. A slave 2 sends a Mark request to the master, to store a recording file named key and whose recording progress is value in the local database, such as AudioRecord20190805101902078.amr, 03865. The master broadcasts a quantity of marks in current recording to the slave: Mark=1. Recording mark information and recording file information are stored separately, the mark information being stored in the database of the master, and the recording information being stored in a locally stored recording file.

During recording, any slave may send a Stop Record instruction to the master. If the master receives the Stop Record instruction sent by the slave, the system stops recording, stores the file to the database, and displays a recording result prompt. The master broadcasts a record state: Record State=idle to the slave, and sends a reason for recording ending, instructs the slave to update the record state, and displays the related prompt according to the reason.

If a plurality of slaves simultaneously send instructions to the master, the master performs an operation according to received instruction information. For example, if a slave A sends a Start Record instruction to the master, and a slave B also sends a Start Record instruction to the master, the master performs an operation according to instruction information received first. Assuming that the Start Record instruction from the slave B is received first, the master accepts a recording request and broadcasts a state Record State=recording. The master performs operations according to an order of receiving the instructions, and unifies the timestamps uniformly. When recording and marking are synchronized between the plurality of devices, data confusion is not caused, and data storing logic is clearer.

In this embodiment, the request of each slave is collected by the master, including starting recording, performing marking, and ending recording. The slave is requested to perform recording, send recording information and mark information to the master, and generates and stores marks on the master and stores the recording file. If each slave needs to obtain data, the slave needs to obtain the data from the master. This method can ensure data consistency. All timestamps are generated locally by the master according to an order of receiving requests of the slaves. If the plurality of slaves simultaneously sends request instructions, a corresponding operation is performed based on an instruction received by the master first. Because the timestamps are generated at a same local time, precision is high. Since this embodiment is used for synchronization of recording marks between a plurality of devices, this embodiment has high precision relative to the problem that local time inconsistency of the devices after the slave generates a mark and synchronizes mark information to the master leads to a deviation in precision of generating marks. For another example, if the slave generates and saves a mark locally and synchronizes data to other devices, mark data of the salve is inconsistent with data of other devices due to reasons such as a network abnormality, and use of network bandwidth increases geometrically as a quantity of devices increases. In this embodiment, data needs to be synchronized to the master only once, so that bandwidth is used less, and the present disclosure is particularly suitable for use in a conference system. Due to particularity of the conference system, other functions of the slave are also unavailable when the master is abnormal, and there is no need to consider a case in which the master is abnormal and recording information and mark information of the slave are not synchronized to the master in time.

Embodiment 2

Figure 2:
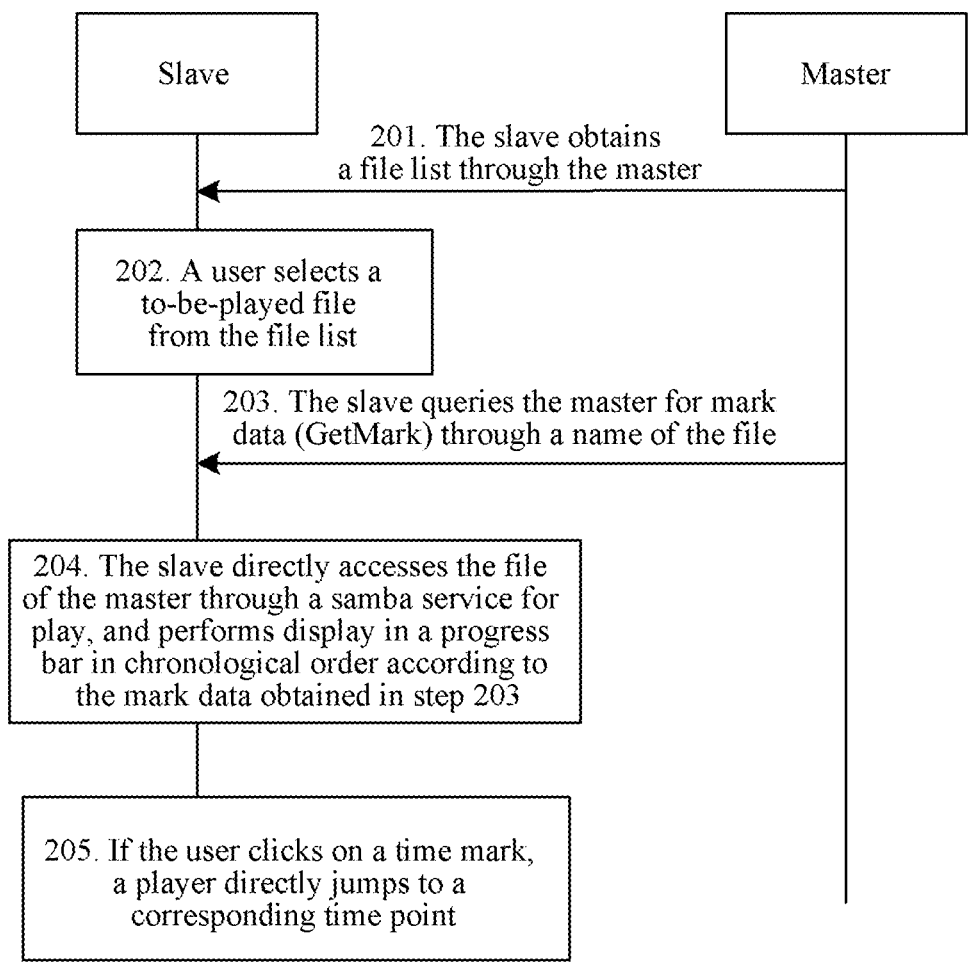
FIG. 2 is a schematic diagram of a play procedure of a slave according to the present disclosure.

This embodiment has the same front-end setting as the system in Embodiment 1. A difference lies in that, as shown in FIG. 2, when the system is playing, a slave obtains a file list through a master, a user selects a name of a to-be-played file from the file list obtained by the slave, and the slave queries the master for mark data through the file name, sends an instruction Get Mark to the master, and queries a database of the master for the mark data with the name of the recorded file through the file name. The slave queries the master for the list of recorded files of the master through a Samba service and presents the file list to the user. The user selects one of the files: AudioRecord20190805101902078.amr. The slave queries the master for a mark list through GetMark=AudioRecord20190805101902078.amr. After querying the database through the file name, the master returns the file to the slave. The slave directly plays the file through the samba service, and displays a recording mark according to the mark list in a progress bar.

The slave directly accesses the file of the master through the samba service, obtains all recording mark data according to the Get Mark instruction sent by the slave to the master, and displays the mark data in the progress bar according to a time progress and presents the mark data to the user. The user clicks on a time mark, and a player directly jumps to a corresponding time point to play.

Embodiment 3

A conference system includes a multi-device recording marking and synchronization system and further includes a camera, a display, and an audio play device, where the camera, the display, and the audio play device are all connected to a master, the camera being configured to capture video information in a conference and send the video information to the master, the display being configured to play the video information sent by the camera to the master, and the audio play device being configured to play audio information in the conference. The camera, the display, and the audio play device are connected to the master through a wireless connection. The wireless connection simplifies deployment of the conference system and facilitates operation. The multi-device recording marking and synchronization system is applied to the conference system to mark key parts in the conference system, so that the key parts can be quickly found later. In this way, a plurality of devices can perform recording and marking in a same conference, and a recording and marking synchronization function can be implemented between the plurality of devices, instead of a radio function of a single device, thereby ensuring consistency of recording and marking data between the plurality of devices. Therefore, the present disclosure is very convenient for use and has simple operation logic and low system costs.

Although the present disclosure-creation and implementations thereof have been exemplarily described above, the description is not limiting. The present disclosure can be implemented in other specific forms without departing from the spirit or the basic feature of the present disclosure. The content shown in the accompanying drawings is merely one of the implementations of the present disclosure, and the actual structure is not limited thereto. Any reference signs in the claims should not be construed as limiting the claims. Therefore, under the teaching of the present disclosure, any structures and embodiments similar to the technical solution that are made by those skilled in the art without creative efforts and without departing from the spirit of the present disclosure shall all fall within the protection scope of the present disclosure. Therefore, under the teaching of the present disclosure, any structures and embodiments similar to the technical solution that are made by those skilled in the art without creative efforts and without departing from the spirit of the present disclosure shall all fall within the protection scope of the present disclosure. In addition, the word "include" does not exclude other elements or steps, and the word "a/an" before the element is not excluded from including "a plurality of" the elements. A plurality of elements described in the product claims may also be implemented by an element by software or hardware. The words such as first, second, and the like are used to denote names and do not denote any particular order.

What is claimed is:

1. A multi-device recording synchronization method, comprising the following steps:
step 1: respectively establishing, by a master, connections with an external network and a slave through a network interface, at least one slave being connected;
step 2: establishing, by the master, a file sharing service with the slave, and allowing the slave to read a recording data file and a marking data file of the master; and
step 3: communicating, by the master, with the slave, performing a voice recording-related operation according to an instruction received from the slave, and broadcasting a state relating to the instruction to a plurality of slaves, so that the plurality of slaves enter the state,
wherein, when the plurality of slaves sends instructions to the master, the instructions received by the master are executed in an order of receiving the instructions by the master.

2. The multi-device recording synchronization method according to claim 1, wherein a remote procedure call manner is used for communication between the master and the slave.

3. The multi-device recording synchronization method according to claim 1, wherein after the master is started and is connected to the slave in step 1, the slave sends a heartbeat packet to the master at a specified time interval to confirm that the slave is alive.

4. The multi-device recording synchronization method according to claim 1, wherein the instruction received from the slave in step 3 comprises one of starting recording, stopping recording, performing marking, and obtaining a mark.

5. The multi-device recording synchronization method according to claim 4, wherein in step 3, the master broadcasts a recording state or an idle state to the slave after receiving the instruction, and all slaves enter the recording state or the idle state synchronously after the master broadcasts the recording state or the idle state.

6. The multi-device recording synchronization method according to claim 5, wherein when the master is in the idle state, any slave is capable of sending an instruction to the master to request to start recording or to obtain a mark.

7. The multi-device recording synchronization method according to claim 5, wherein when the master is in the recording state, any slave is capable of sending an instruction to the master to request to stop recording or to perform recording marking.

8. A multi-device recording synchronization system, wherein the system adopts the method according to claim 1.

9. A conference system, comprising the multi-device recording synchronization system according to claim 8 and further comprising a camera, a display, and an audio play device, wherein the camera, the display, and the audio play device are all connected to the master, the camera being configured to capture video information in a conference and send the video information to the master, the display being configured to play the video information sent by the camera to the master, and the audio play device being configured to play audio information in the conference.

10. The conference system according to claim 9, wherein the camera, the display, and the audio play device are connected to the master through a wireless connection.

11. The multi-device recording synchronization system according to claim 8, wherein a remote procedure call manner is used for communication between the master and the slave.

12. The multi-device recording synchronization system according to claim 8, wherein after the master is started and is connected to the slave in step 1, the slave sends a heartbeat packet to the master at a specified time interval to confirm that the slave is alive.

13. The multi-device recording synchronization system according to claim 8, wherein the instruction received from the slave in step 3 comprises starting recording, stopping recording, performing marking, and obtaining a mark.

14. The conference system according to claim 9, wherein a remote procedure call manner is used for communication between the master and the slave.

15. The conference system according to claim 9, wherein after the master is started and is connected to the slave in step 1, the slave sends a heartbeat packet to the master at a specified time interval to confirm that the slave is alive.

16. The conference system according to claim 9, wherein the instruction received from the slave in step 3 comprises starting recording, stopping recording, performing marking, and obtaining a mark.

* * * * *